United States Patent
Mitchell

(10) Patent No.: US 11,777,599 B2
(45) Date of Patent: *Oct. 3, 2023

(54) FREE SPACE OPTICAL COMMUNICATION TERMINAL WITH ROTATABLE DISPERSIVE OPTICAL COMPONENT

(71) Applicant: SA PHOTONICS, INC., Los Gatos, CA (US)

(72) Inventor: Greg G. Mitchell, Elk Grove, CA (US)

(73) Assignee: SA PHOTONICS, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,231

(22) Filed: Oct. 17, 2022

(65) Prior Publication Data

US 2023/0128045 A1 Apr. 27, 2023

Related U.S. Application Data

(63) Continuation of application No. 17/485,079, filed on Sep. 24, 2021, now Pat. No. 11,476,933.

(60) Provisional application No. 63/083,000, filed on Sep. 24, 2020.

(51) Int. Cl.
*H04B 10/11* (2013.01)
(52) U.S. Cl.
CPC ................................. *H04B 10/11* (2013.01)
(58) Field of Classification Search
None
See application file for complete search history.

(56) References Cited

U.S. PATENT DOCUMENTS

| | | | |
|---|---|---|---|
| 6,839,519 B1 * | 1/2005 | Kleiner | H04B 10/118 356/141.2 |
| 10,411,797 B1 * | 9/2019 | Mitchell | G02B 6/4249 |
| 11,476,933 B1 * | 10/2022 | Mitchell | H04B 10/118 |
| 2007/0031150 A1 * | 2/2007 | Fisher | H04B 10/118 398/128 |
| 2008/0226307 A1 * | 9/2008 | Lundquist | G01N 21/6452 398/202 |
| 2015/0188628 A1 * | 7/2015 | Chalfant, III | H04B 10/112 398/131 |
| 2017/0052334 A1 * | 2/2017 | Graves | H04B 10/1123 |
| 2018/0083700 A1 * | 3/2018 | Graves | H04B 10/1125 |

* cited by examiner

*Primary Examiner* — David W Lambert
(74) *Attorney, Agent, or Firm* — BakerHostetler

(57) ABSTRACT

Embodiments relate to a free space optical (FSO) terminal that transmits and receives optical beams. The FSO terminal includes a fore optic and a rotatable dispersive optical component. A receive (Rx) optical beam from the remote FSO communication terminal is received through the fore optic, and a transmit (Tx) optical beam is transmitted through the fore optic. The dispersive optical component is positioned along the optical paths of both the Rx and Tx optical beams. Since the Rx and Tx optical beams have different wavelengths and the dispersive optical component has a wavelength dependence, the dispersive optical component creates an angular separation between the Rx and Tx optical beams. The controller controls the rotational position of the dispersive optical component (and possibly also the wavelength of the Tx optical beam) to achieve a desired angular separation between the Rx and Tx optical beams.

20 Claims, 10 Drawing Sheets

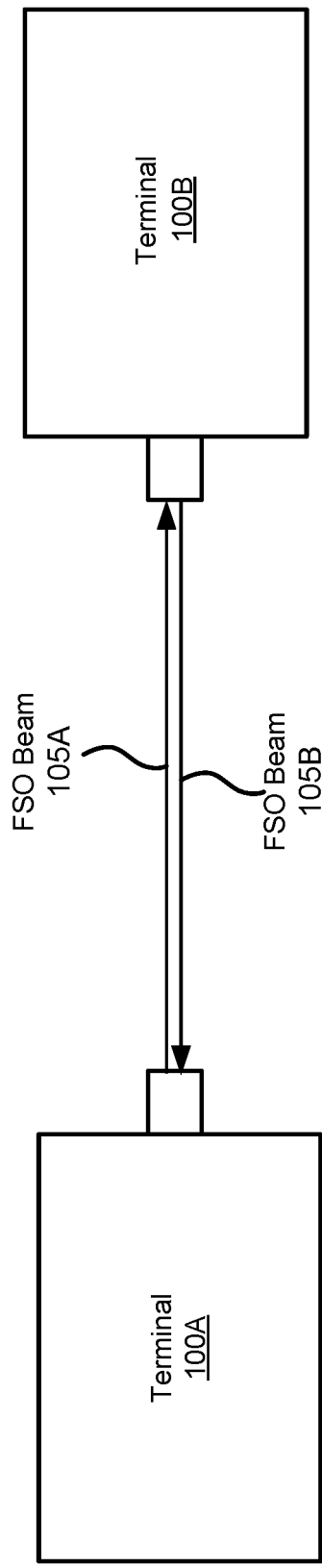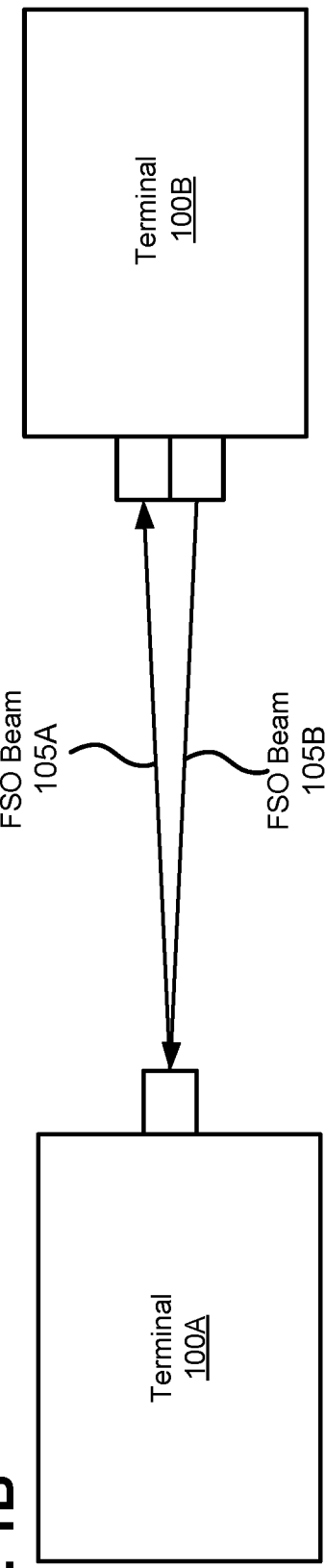

FREE SPACE OPTICAL COMMUNICATION TERMINAL WITH ROTATABLE DISPERSIVE OPTICAL COMPONENT

CROSS-REFERENCE TO RELATED APPLICATIONS

This application is a continuation of U.S. patent application Ser. No. 17/485,079, filed Sep. 24, 2021, which claims the benefit of U.S. Provisional Patent Application No. 63/083,000, filed Sep. 24, 2020, each of which are incorporated herein by reference in its entirety for any and all purposes.

BACKGROUND

1. Technical Field

This disclosure relates generally to free space optical (FSO) communication terminals and, more particularly, to a FSO communication terminal with a dispersive optical component.

2. Description of Related Art

Free space optical (FSO) communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations.

In contrast with other electromagnetic communications means, FSO signals (also referred to as beams) are more directional. The directionality confers benefits both for communications capacity and for communications privacy. However, FSO technology typically requires accurate pointing between terminals to establish and maintain a viable FSO link. Furthermore, some FSO terminals may benefit from transmitted beams and received beams that propagate along different directions.

SUMMARY

Some embodiments relate to a free space optical (FSO) communication terminal that transmits and receives (e.g., data-encoded) optical beams, for example to and from a remote FSO communication terminal. The FSO terminal includes a fore optic and a rotatable dispersive optical component. A receive (Rx) optical beam from the remote FSO communication terminal is received through the fore optic, and a transmit (Tx) optical beam is transmitted through the fore optic. The dispersive optical component is positioned along the optical paths of both the Rx and Tx optical beams. Since the Rx and Tx optical beams have different wavelengths and the dispersive optical component has a wavelength dependence, the dispersive optical component creates an angular separation between the Rx and Tx optical beams. The controller controls the rotational position of the dispersive optical component (and possibly also the wavelength of the Tx optical beam) to achieve a desired angular separation between the Rx and Tx optical beams.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 1A and 1B are block diagrams of two terminals communicating via FSO communication links.

DETAILED DESCRIPTION

Figure 2A:
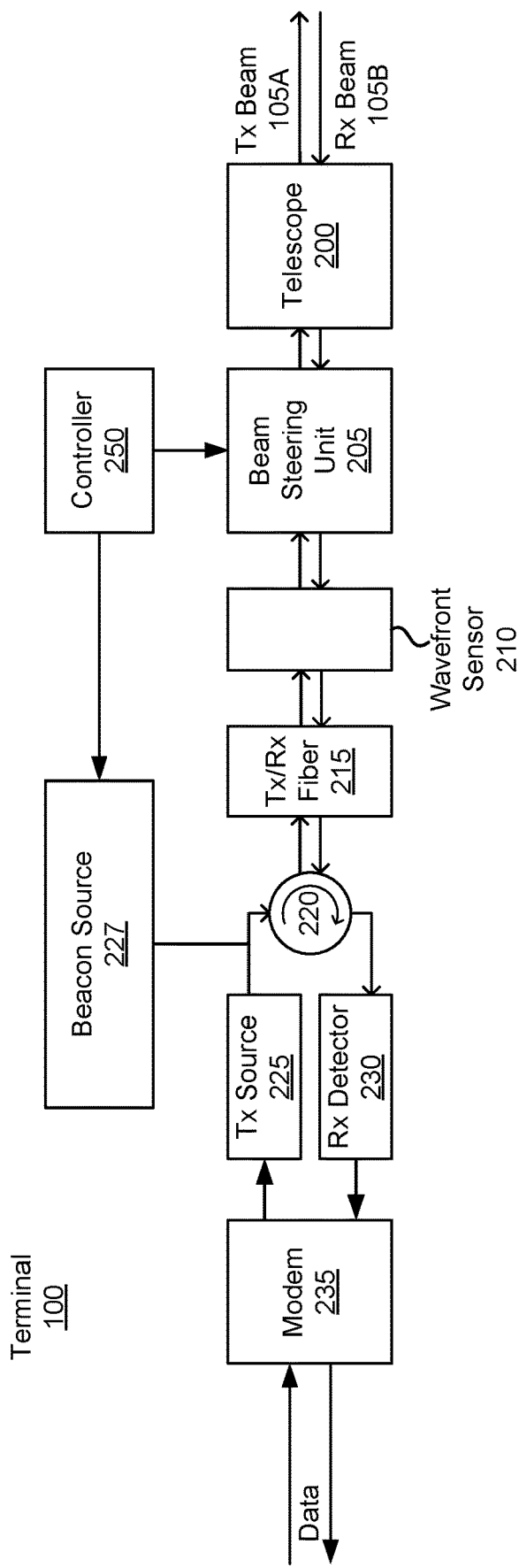
FIG. 2A is a block diagram of a single terminal.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Some of the descriptions herein refer to guided-wave structures as "fiber" because optical fiber is the most commonly used guided-wave structure for the wavelengths typically used in FSO systems. For purposes of disclosure, however, fiber should be understood to include other guided-wave structures such as waveguide or guided structures on integrated optical components.

Before describing further details of the dispersive optical component, FIGS. 1-3 describe operation of FSO terminals.

FSO Communication Terminals

FIGS. 1A and 1B are block diagrams of terminals 100A and 100B (also referred to as nodes) communicating via free space optical (FSO) communication links, according to some embodiments. Specifically, the terminals 100 are communicating by transmitting and receiving FSO beams 105. In FIG. 1A, both terminals 100 are co-boresighted so that beams 105 are received and transmitted though the same aperture. In FIG. 1B, terminal 100A is co-boresighted, but terminal 100B uses separate apertures. In the co-boresighted approach, the same primary optical system may carry signals both for Tx and Rx paths, reducing weight and complexity of separate optical components for Tx and Rx beams. A co-boresighted optical design also simplifies the system and enhances reliability by eliminating separate pointing and tracking mechanisms for Tx and Rx. As described herein, if terminal 100A is referenced as a local terminal, terminal 100B may be referred to as a remote terminal, beam 105A may be referred to as a transmit (Tx) beam, and beam 105B may be referred to as a receive (Rx) beam.

Terminals 100 typically transmit and receive beams at different wavelengths to avoid or reduce beam interference. These wavelengths may be predetermined according to FSO communication standards or specifications. Typically, two wavelengths (or wavelength ranges) are available for selection, where one wavelength is selected for the Tx beam and the other wavelength is selected for the Rx beam (although more than two wavelengths may be available). For example, the Rx beam has a wavelength of 1532 nanometers, and the Tx beam has a wavelength of 1536 nanometers (note that these wavelengths are switched for the remote terminal). In cases where many terminals communicate pairwise, each terminal may be configured to transmit or receive on either of the two wavelengths. In this way, any terminal can communicate with any other terminal. Many optical telecommunications entities use the wavelength grid recommendations defined by the ITU (International Telecommunication Union) (e.g., publication G.694.1 or G.694.2). It may be beneficial to select Tx and Rx wavelengths from ITU grids or from the wavebands they cover because reliable, highly tested equipment may be readily and cheaply available. For some embodiments, one or both of the Tx and Rx wavelengths may be within 100 nm of 1064 nm, where Nd:YAG lasers and compatible photodetectors are readily available.

In both FIGS. 1A and 1B, the two FSO beams 105A,B may be propagating along slightly different directions. That is, they may not be strictly parallel to each other. In FIG. 1B, this is apparent because terminal 100B uses two separate apertures. Even in FIG. 1A, however, the two FSO beams 105A,B may have some angular separation, for example to accommodate a point-ahead angle resulting from relative motion between the two FSO communication terminals 100. As described in more detail below, the angular separation is created by the different wavelength beams 105A,B propagating through a dispersive optical component. The dispersive optical component is rotatable so that the angular separation can be directed along different azimuth directions. In some cases, the magnitude of the angular separation may also be controlled by adjusting the wavelength(s) of the optical beams 105.

FIG. 2A is a block diagram of a single terminal 100. The terminal 100 includes a data I/O interface (not shown), modem 235, Tx source 225, beacon source 227, Rx detector 230, a circulator 220, a Tx/Rx fiber 215, a wavefront sensor 210, a beam steering unit 205, a telescope 200, and a controller 250. In FIG. 2A, electrical signals (both analog and digital) are indicated by the solid arrows and optical signals (both guided and free space) are indicated by the line arrows.

The components are optically coupled as follows. The telescope 200 is optically coupled to the beam steering unit 205. The beam steering unit 205 is optically coupled to the wavefront sensor 210. It is also optically coupled to the circulator 220 via the fiber 215. The ports of the optical circular 220 are optically coupled to the Tx source 225 and source 227 (which are combined into one port), the Tx/Rx fiber 215, and Rx detector 230.

The components are electrically coupled as follows. The controller 250 is electrically coupled to the beam steering unit 205 and the beacon source 227. The modem 235 is electrically coupled to the Tx source 225 and the Rx detector 230. The modem 235 may also receive data from the wavefront sensor 210 (after conversion to digital form) and it may provide data to the controller 250. In some embodiments, the controller 250 is electrically coupled to the wavefront sensor 210, and/or the modem 235.

Figure 2B:
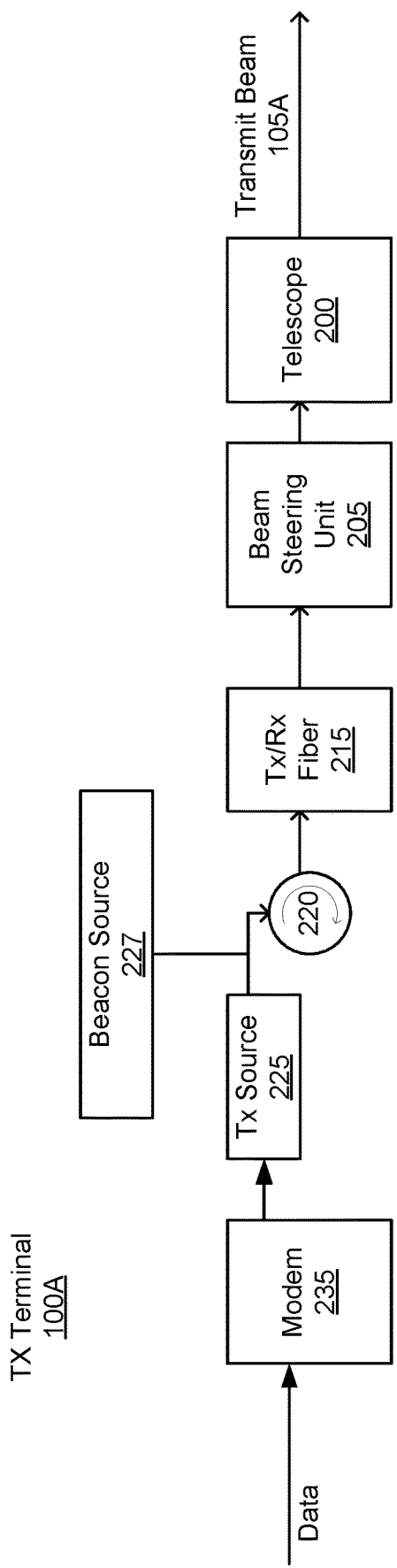
FIGS. 2B-2C are block diagrams of a single FSO communication link.
Figure 2C:
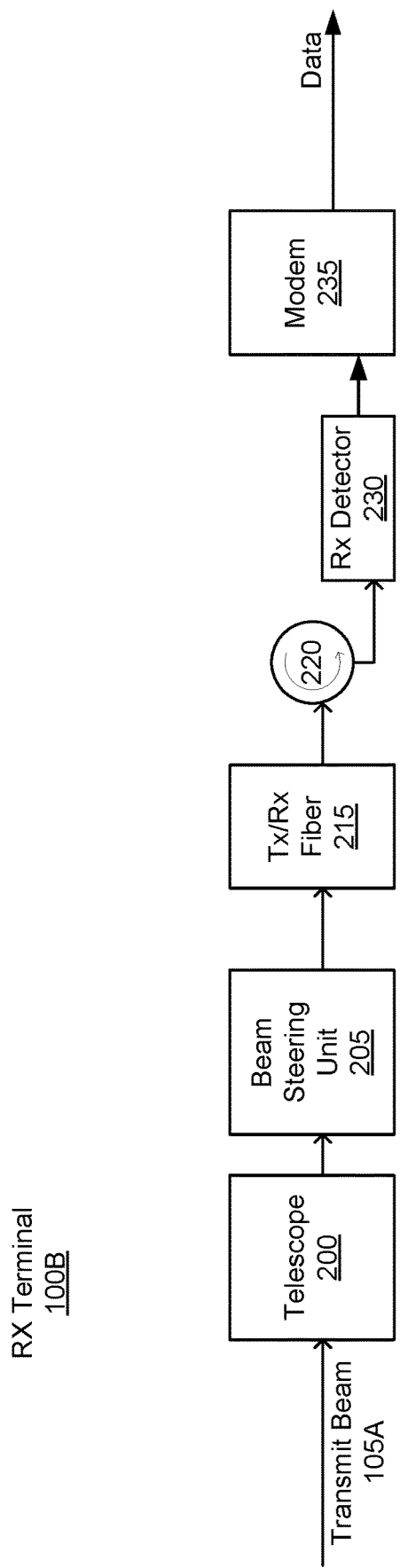

FIGS. 2B and 2C illustrate one FSO communication link from a Tx terminal to a Rx terminal. Specifically, FIGS. 2B and 2C show the data path from Tx terminal 100A to Rx terminal 100B. FIG. 2B shows the data path in the Tx terminal 105A from incoming digital data to outgoing FSO transmit beam 105A. Modem 235 modulates the Tx source 225 based on the incoming data. The data-encoded light is transmitted by circulator 220, fiber 215, beam steering unit 205 to telescope 200, which directs the data-encoded FSO beam 105A to the Rx terminal 100B. FIG. 2C shows the data path at the Rx terminal 100B. Relative to the Rx terminal 100B, the incoming beam is its Rx beam, but it is labelled as transmit beam 105A in FIG. 2C to maintain consistency throughout the figures. The transmit beam 105A is optically coupled from telescope 200, to beam steering unit 205, fiber 215, and circulator 220 to the Rx detector 230. The output of the Rx detector 230 is demodulated by modem 235 to produce the outgoing digital data.

FIG. 2A shows both aspects for a single terminal. The terminal 100 includes at least two optical paths: an Rx beam path and a Tx beam path. In the Rx beam path, a Rx beam 105B propagates through the telescope 200 and is directed towards the beam steering unit 205. The beam steering unit 205 steers the Rx beam to the wavefront sensor 210. A portion of the beam is detected by the wavefront sensor 210 and another portion of the beam is coupled into the fiber 215. Light in the fiber 215 is directed by the circulator 220 to the Rx detector 230. In the Tx beam path, a Tx beam from the Tx source 225 is directed to the fiber 215 by the circulator 220. The Tx beam is emitted from the fiber 215 and towards the beam steering unit 205. The Tx beam is directed by the beam steering unit 205 towards the telescope 200. The Tx beam 105A propagates through the telescope 200 and into free space.

The telescope 200 and beam steering unit 205 are optical components that direct Rx beams to the wavefront sensor 210 and fiber 215, and direct Tx beams to the remote terminal. In some embodiments, the telescope 200 is positioned upstream of the beam steering unit 205 with respect to the Tx beam path. The telescope 200 includes one or more components that can spread, focus, redirect, collimate, project, and otherwise modify the beams 105 passing through it. The position of the telescope 200 relative to the terminal 100 is typically fixed. The telescope 200 may be as simple as a single lens or it may include different or additional optical components, such as diffusers, phase screens, beam expanders, mirrors, and lenses. The components from the fiber 215 to the telescope 200 may also be referred to as a fore optic. This is further described with reference to FIG. 5.

Many embodiments of the beam steering unit 205 are compatible with the present invention. This can be, for example, a mechanically driven reflective or refractive device. Examples of such devices include mirrors, Fresnel devices, and lenslet arrays. The mechanical driver for any one of these examples may include voice-coil actuators, piezoelectric actuators, and servo-motor driven positioners. Additionally or alternatively, microelectronic array (MEMS) devices or opto-acoustic devices that exploit acoustic waves in reflective or refractive materials can be used.

The beam steering unit 205 may operate in different modes, such as a beam acquisition mode or a beam tracking mode. For example, an initial Tx direction can be established through a beam acquisition mode. The Tx direction may be determined or updated based on feedback signals (e.g., alignment errors), for example from the controller 250, modem 235, and the wavefront sensor 210 (this feedback path not shown in FIG. 2). In some cases, the Tx beam 105A is transmitted by the telescope 200 along the same direction as the Rx beam 105B is received (the Rx direction may be determined from the wavefront sensor 210). In some cases, the Tx direction is not parallel to the Rx direction. For example, atmospheric conditions between terminals 100 can affect beams differently depending on their propagation direction. In these cases, Tx and Rx beams may travel different optical paths between terminals 100. In another example, the Tx beam is directed towards an expected future location of a remote terminal 100 (referred to as point ahead).

Figure 3A:
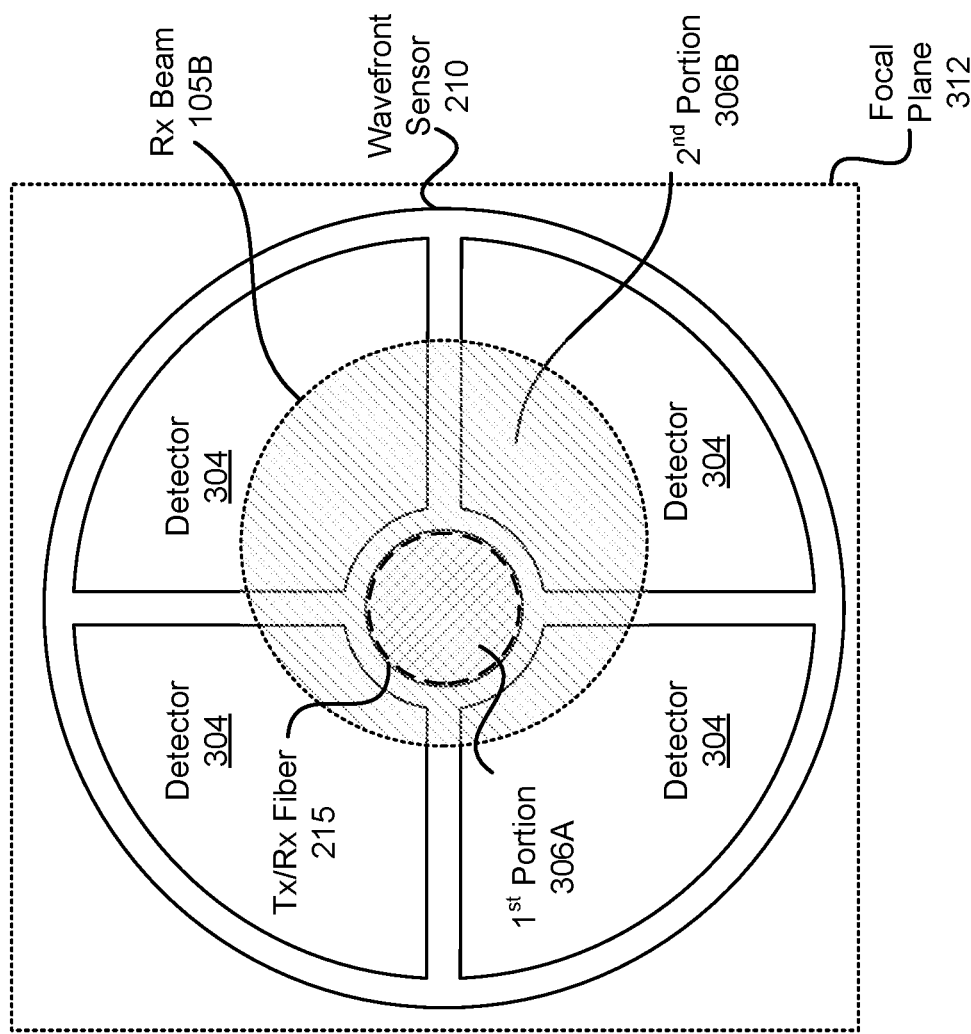
FIGS. 3A-3B are diagrams of a wavefront sensor at a telescope focal plane.
Figure 3B:
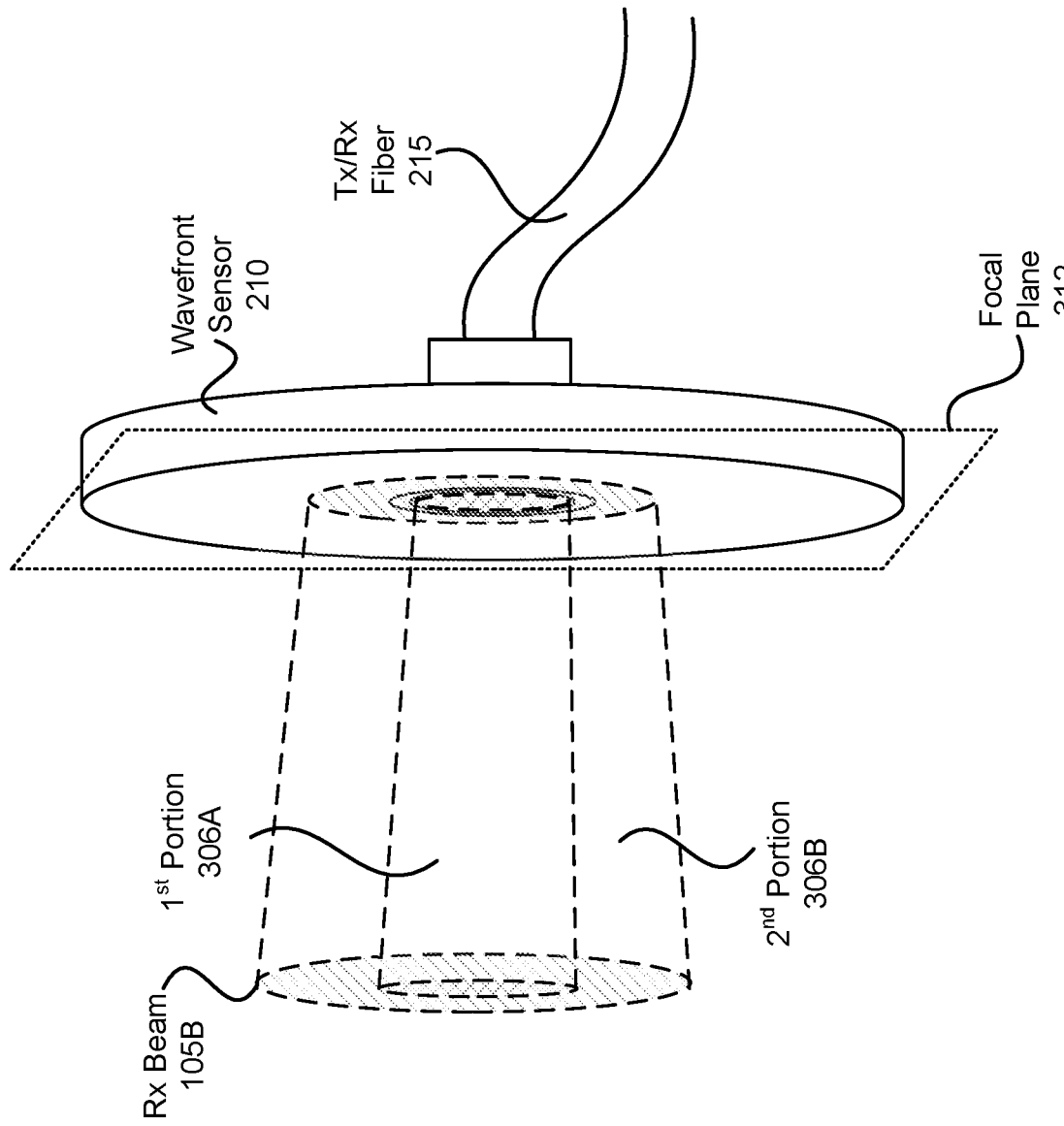

The wavefront sensor 210 is described with reference to FIGS. 3A and 3B. FIG. 3A is a front view of the wavefront sensor 210 and FIG. 3B is a perspective view of the wavefront sensor 210. The wavefront sensor 210 is a component that detects incident light (e.g., the Rx beam 105B) for position detection, acquisition, and tracking. The wavefront sensor 210 may be located at a focal plane 312 of the telescope 200. The wavefront sensor 210 includes a cavity (e.g., in the center) that surrounds an end of the Tx/Rx fiber 215. Thus, when an Rx beam 105B is directed to the focal plane 312, the Tx/Rx fiber 215 receives a portion of the Rx beam (the first portion 306A) and the wavefront sensor 210 receives another portion of the Rx beam (the second portion 306B). This allows light directed to the wavefront sensor 210 to be coupled into the fiber 215.

The wavefront sensor 210 is used for signal acquisition and alignment of the FSO terminal 100. To do this, the wavefront sensor 210 includes detectors 304 to determine the position of the incident Rx beam 105B. Based on the detected position of the Rx beam 105B, the FSO terminal 100 can align components of the FSO terminal 100 (e.g., the telescope 200, beam steering unit 205, or the wavefront sensor itself) so that the Rx beam 105B is centered on the wavefront sensor 210. The Rx beam 105B may be directed to another location on the wavefront sensor 201, for example if the fiber 215 is not centered on the sensor 210 or to account for point ahead. Components other than a wavefront sensor may additionally or alternately perform position detection, acquisition, and tracking. By way of example, a sensor can be an overmoded guided-wave structure with a means to measure the power in the structure's propagating modes.

In the example of FIGS. 3A and 3B, the wavefront sensor 210 is a quad-cell sensor. However other multi-cell sensors may be used. Together, the four detectors 304 can be used to determine the horizontal and vertical position of the Rx beam 206 on the wavefront sensor 202. The detectors 304 may be photodetectors or other electromagnetic-wave detectors that convert the incoming electromagnetic waves into electrical current. The wavefront sensor 210 can include light detectors capable of detecting different types of light signals, e.g., low and high light intensities, specific wavelengths, etc. This allows the terminal 100 to operate in low light (e.g., at night) and high light situations (e.g., at midday).

Referring back to FIGS. 2A-C, the Tx/Rx fiber 215 is an optical fiber, such as a multi-mode fiber (MMF), dual core fiber, or double clad fiber. If the fiber 215 is a double clad fiber, Tx beams may propagate through the core while Rx beams propagate through the inner cladding. The circulator 220 can be a single-mode or multi-mode circulator. Example circulators are described in patent application Ser. No. 16/259,899 "Optical Circulator with Double-Clad Fiber" which is incorporated herein by reference in its entirety. The Rx detector 230 is a photodetector that converts Rx beams from the circulator 220 into electrical signals. For example, the Rx detector 230 is an avalanche photodiode (APD). The Tx source 225 converts transmit data from the modem 235 into Tx beams. The Tx source 225 can include a laser.

The modem 235 modulates data to be transmitted in Tx beams. Specifically, the modem 235 converts incoming data from the I/O interface 240 into a modulated electrical signal. The modulated signal is sent to the Tx source 225 and converted into a Tx beam. The modem 235 can also demodulate data encoded in Rx beams. Specifically, the modem 235 decodes information in the electrical signals from the Rx detector 230. The remaining decoded information may be transmitted to I/O interface (e.g., to be transmitted to another terminal). The modem 235 can include any electronics and/or computer instructions that modulate or demodulate signals, including physical (PHY) layer or medium access control (MAC) related processes (such as error correction).

The beacon source 227 is an optical source (such as a laser) that can produce Tx optical beams 105. If the beacon source 227 and the Tx source 225 are separate components, the beacon source 227 may share a port of the circulator 220 with the Tx source 225 so that beams from the beacon source 227 are also directed by the fiber 215, beam steering unit 205 and telescope 200. In some embodiments, beams from the beacon source 227 have a fixed wavelength. In other embodiments, the beacon source 227 can produce optical beams at different wavelengths.

Optical beams 105 from the beacon source 227 may be used as beacon beams during a beam acquisition process to establish an FSO communication link and also during a tracking mode to maintain the FSO communication link. As a result, beacon beams typically have larger divergences than data-encoded beams from the Tx source 225. For example, the divergence of beacon beams may be two to four times larger than the divergence of the data-encoded beams (however larger and smaller ratios are also possible). Beam divergence is a measure of the increase in a beam's diameter or radius with distance. In some embodiments, the beacon source 227 and the Tx source 225 are a single component. That is, for example, the optical beam produced by the single source 227/225 is used both as a beacon beam during the beam acquisition process and as the data-encoded beam during data transmission.

The controller 250 receives information (e.g., from the wavefront sensor 210 and the modem 235) to determine alignment errors between the terminal 100A and the remote terminal 100B. The controller 250 provides instructions (e.g., to the beam steering unit 205) to reduce the alignment errors.

Dispersive Optical Component

Figure 4:
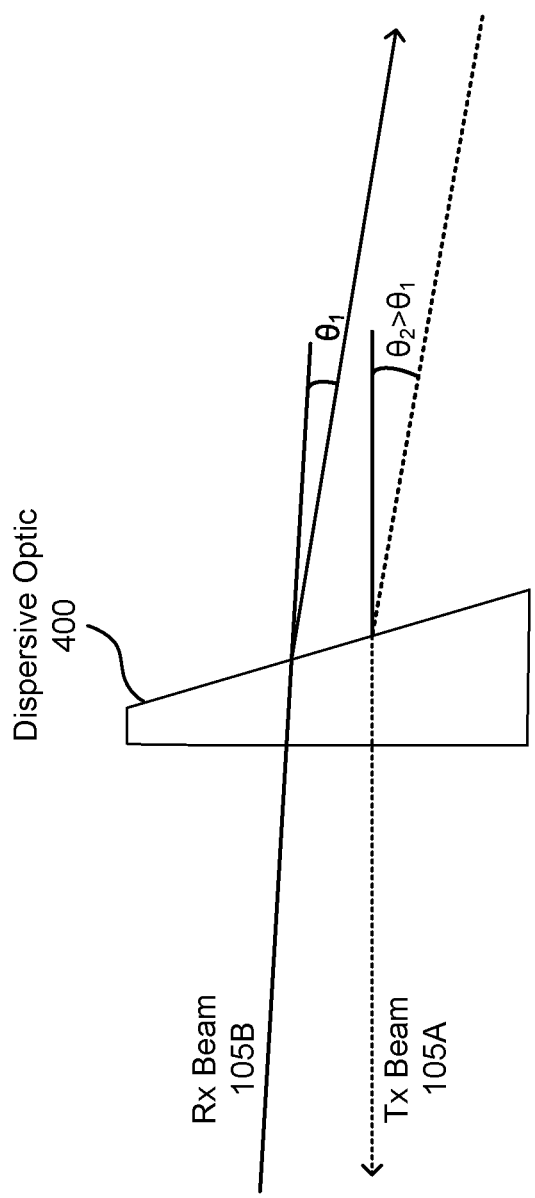
FIG. 4 is a diagram of a dispersive optical component that directs Tx and Rx beams with different wavelengths.

In some embodiments, the terminal includes a dispersive optical component positioned along optical paths of both the Rx and Tx beams (e.g., positioned in the telescope 200). Since the Tx and Rx beams have different wavelengths, a wavelength dependence of the dispersive optical component results in an angular separation of the Tx and Rx beams in free space. FIG. 4 provides a diagram of a dispersive optical component 400 (also referred to as a dispersive optic 400) that directs Tx and Rx beams with different wavelengths. In the example of FIG. 4, the Rx beam 105B is refracted downward at angle $\theta_1$ and the Tx beam 105A is refracted downward at angle $\theta_2$, where $\theta_1$ and $\theta_2$ result from the Rx and Tx wavelengths and variation of an index of refraction of the dispersive optic 400 as a function of wavelength (discussed further below). In this example, $\theta_2$ is larger than $\theta_1$. However, this is not required. If dispersive optic 400 is a diffractive device, $\theta_1$ and $\theta_2$ may result from diffraction rather than refraction. In FIG. 4, the two optical beams 105A,B are parallel to the right of the dispersive optic (i.e., within the terminal), and they are propagating along different directions to the left of the dispersive optic (i.e., within free space). In this way, angular separation of the optical beams 105 in free space may be achieved.

Figure 5:
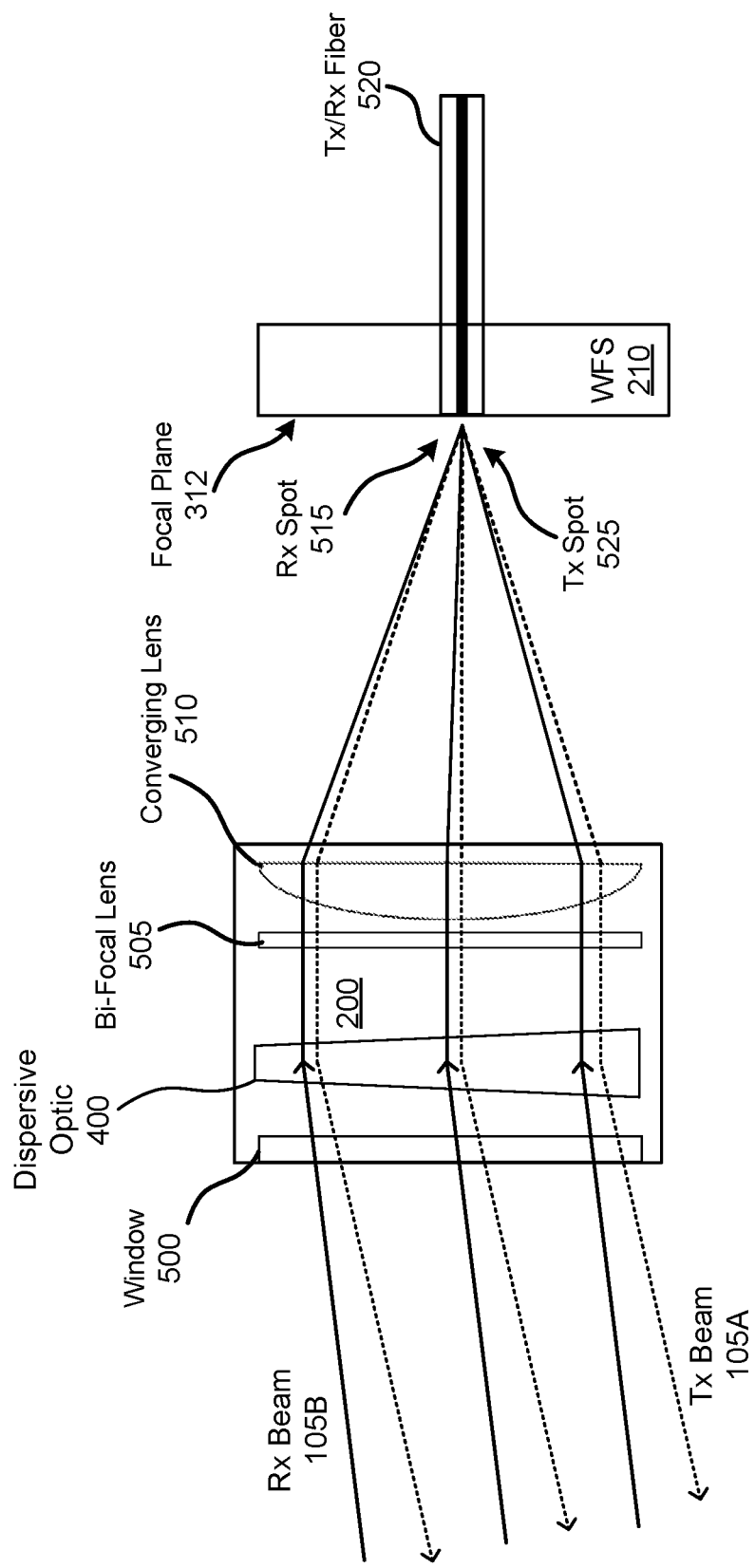
FIG. 5 is a cross-section diagram of a telescope and wavefront sensor with dispersive optic.

FIG. 4 illustrates the dispersive optic 400 in isolation to demonstrate how it affects the beams. However, the dispersive optic 400 may be part of the telescope 200 or another optical component of the terminal. FIG. 5 illustrates a cross-section diagram of the telescope 200 (with the dispersive optic 400), the wavefront sensor 210, and optical fiber 520 coupled to the wavefront sensor 210. The beam steering unit 205 is omitted for convenience. FIG. 5 also includes additional rays of the Tx and Rx beams 105A,B to illustrate the width of the beams before and after the telescope 200.

In the example of FIG. 5, the Tx/Rx fiber 520 is a double clad fiber, where the Tx beam propagates along the single mode center of the fiber 520 but the fiber 520 has a larger multimode area for coupling the Rx beam. The end of the fiber is located at the focal plane 312 of the telescope 200. Since it may be difficult to place an object exactly at the focal plane, the phrase "at the focal plane" as used herein may refer to objects close enough to the focal plane that defocusing losses remain within acceptable limits for communication purposes. For example, an object "at the focal plane" may refer to an object within 20 micrometers of the focal plane. In some embodiments, Tx beam collimation is more important than Rx focusing, and this sets the maximum acceptable distance for objects "at the focal plane." Tx beam collimation may depend on system focal length and it may vary between systems. In some embodiments, fibers may not be physically located at the focal plane 312. For example, an optical relay system may be used so that a fiber end can be spaced apart from the focal plane.

As previously described, the telescope 200 includes optical components that receive the Rx beam 105B and focus it to a Rx spot 515 at the focal plane 312 and that direct the Tx beam 105A from a Tx spot 525 at the focal plane 312 to the remote terminal. In the example of FIG. 5, the telescope 200 includes a window 500 that allows beams to propagate in and out of the terminal, a bi-focal lens 505, and a converging lens 510. When it is used, the bi-focal lens 505 may distribute some of the Rx signal over the WFS 210 and may thereby enable the telescope 200 to be pointed accurately toward the incoming Rx beam 105B. However, the telescope 200 may include different, additional, or fewer optical components. For illustrative convenience, the rays of the Rx and Tx beams in FIG. 5 are illustrated as if the optical components of the telescope 200 form a single optical component (the beams propagate straight through the telescope 200). However, each of the optical components may affect the beams according to their optical properties (e.g., the beams are bent by the dispersive optic 400 as shown in FIG. 4). The remaining figures are similarly illustrated in this fashion.

Without the dispersive optic 400, the telescope 200 may direct the Rx beam 105B and the Tx beam 105A without angular separation in free space. In that case, the Tx and Rx beams 105 propagate along a same fiber (the Tx/Rx fiber 520) and then parallel to each other in free space. In the example of FIG. 5, the Tx/Rx fiber 520 is a double-clad fiber where the Tx beam 105A propagates through the single-mode core and the Rx beam 105B is coupled into the multi-mode cladding.

However, with the dispersive optic 400 (as shown in FIG. 5), the Tx and Rx beams 105A,B may be angularly separated in free space while still coupling to the same spot 515,525 at the focal plane 312 so that the beams can be coupled to/from the same fiber 520. In FIG. 5, the Rx beam 105B is bent some by the dispersive optic 400 and the Tx beam 105A is bent more, leading to the angular separation. In this configuration, both beams 105 are propagating off-axis and there is some average angular offset for the two beams. Other optical elements (such as an achromatic wedge) may be used to reduce or eliminate this offset, so that the beams 105 are propagating closer to on-axis.

The dispersive optic 400 may be a refractive optical component, such as a prism. A beam passing through a refractive optical component may refract according to Snell's law which states that the angle of refraction is based on the angle of incidence of the incoming beam, the index of refraction of the optical component, and index of refraction of the media outside of the component (e.g., air). In the example of FIGS. 4 and 5, the dispersive optic 400 is a wedge that refracts beams by a fixed angle that depends on wavelength. A wedge is a prism with a shallow angle between its input and output surfaces. This angle may be between 0.1 and 20 degrees. In some embodiments, the dispersive optic 400 is a diffractive optical component. For example, the refractive optical component is a diffraction grating, which includes a periodic structure that diffracts light into several beams travelling in different directions.

The description herein refers to the dispersive optic 400 as a single optical component. However, this is merely for convenience. The dispersive optic 400 may include multiple optical components (e.g., it includes a refractive optical component and a diffractive optical component (e.g., a "grism")). In this case, the components may work in conjunction to achieve the desired wavelength dependence.

The angular separation of the Tx an Rx beams 105 may depend on one or more factors, such as the wavelengths of the Tx and Rx beams 105. If the dispersive optic 400 is a refractive optic, the angular separation may also depend on the geometry of the optic 400 and the variables in Snell's law. If the dispersive optic 400 is a diffraction grating, the directions of the beams may depend on the period of the grating.

In some embodiments, it is advantageous to reduce the size or weight of the FSO terminal (e.g., the terminal is mounted to an aircraft or satellite). In some cases, a designer may select the minimum thickness of the wedge that still produces sufficient angular differences in the Tx and Rx propagation to separate them. In these embodiments, the maximum thickness of the dispersive optical component 400 may be 11 millimeters or less (e.g., measured as the largest distance between the input and output surfaces). In another example, the weight of the dispersive optical component 400 is not more than one-half of a kilogram (e.g., for a component 400 with a 100-millimeter diameter aperture, 11-degree wedge, and the typical density of glass or silicon.). To reduce the size or weight of the dispersive optical component 400 but still have enough angular separation, the dispersive optical component 400 may be fabricated from a high-dispersion material such as silicon. In some embodiments, the dispersive optical component 400 has an index of refraction between 1.5 and 4.2. In some embodiments, to reduce the size or weight of the terminal, the dispersive optic 400 is combined with other optics in the telescope 200, such as the bi-focal lens 505.

Figure 6:
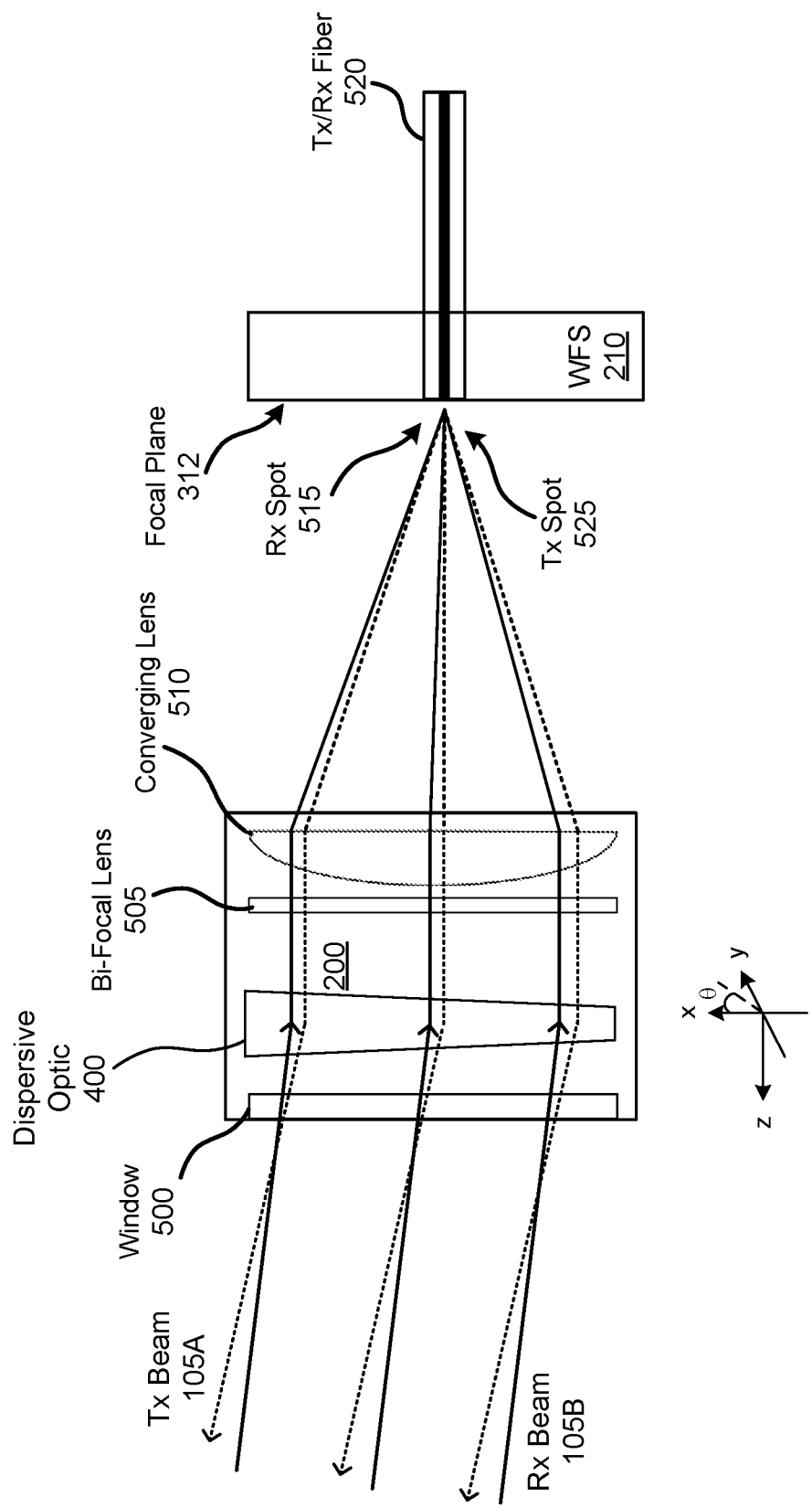
FIG. 6 is the same as FIG. 5, but the dispersive optic is rotated.

The wedge may be located in a collimated or near-collimated space to reduce optical aberrations. Given the steering angle that would typically result from going through a wedge, the output of the system (from a Tx perspective) is a possible location, as shown in FIGS. 5 and 6. In some cases, the wedge may also be located in an interim collimated space, such as the collimated space between a fiber collimator and a beam expander.

For embodiments where the Tx and Rx wavelengths are selected from ITU channels (e.g., recommended in ITU publication G.694.1 or G.694.2 as described earlier), the Rx and Tx wavelength selections and differences between the wavelengths may be selected to match an available dispersive optic 400 and telescope 200 with to achieve the desired angular separation in free space. Owing to the mechanical and electrical interoperability among products for these commonly-used wavelengths, the Tx and Rx wavelengths and hence the angular separation may be modified for a given terminal by interchanging compatible products.

Adjustment of Angular Separation

In FIG. 5, if the wavelengths of the Tx and Rx beams 105 are fixed and the construction and position of the dispersive optic 400 are fixed, then the angular separation introduced by the dispersive optic 400 will also be fixed. In some applications, it is desirable to be able to adjust the angular separation. Different mechanisms may be used to accomplish this. In one approach, the Tx and/or Rx wavelengths are adjustable, which allows adjustment of the magnitude of the angular separation (difference in angle between the Tx and Rx beams) and also possibly adjustment of the angular offset (average of angles of the Tx and Rx beams). The dispersive optic 400 may also be rotatable in azimuth. In FIG. 5, this would be rotation about the optical axis. This can be used to adjust the azimuth orientation of the angular separation.

FIG. 6 shows the same components as FIG. 5, but the dispersive optic is rotated by 180 degrees. The magnitude of the angular separation between the two beams 105 is the same as in FIG. 5, but the azimuth orientation of the angular separation is rotated by 180 degrees. FIG. 6 also introduces a coordinate system, where z is the optical axis, x and y are the transverse coordinates, and θ measures the azimuth rotation from the x-axis. In FIG. 6, the dispersive optic 400 is rotated to θ=0 degrees. In FIG. 5, the dispersive optic 400 is rotated to θ=180 degrees.

Figure 7C:
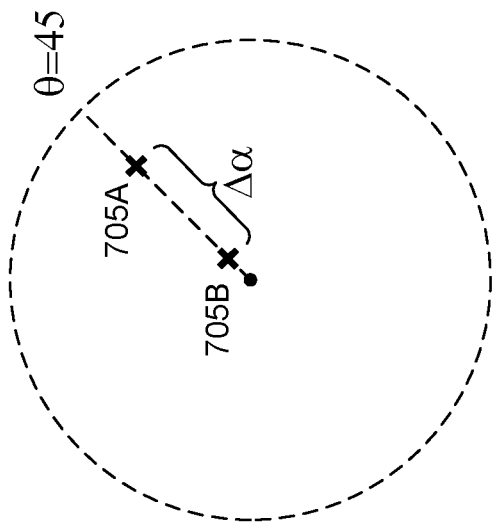
FIGS. 7A-7C are diagrams showing the effect of adjusting wavelength and the rotational position of the dispersive optic.
Figure 7B:
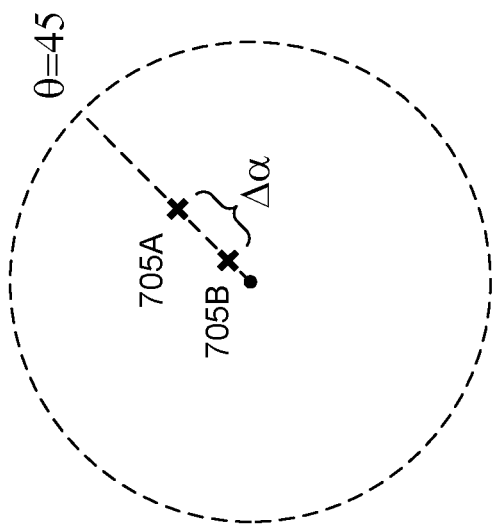
Figure 7A:
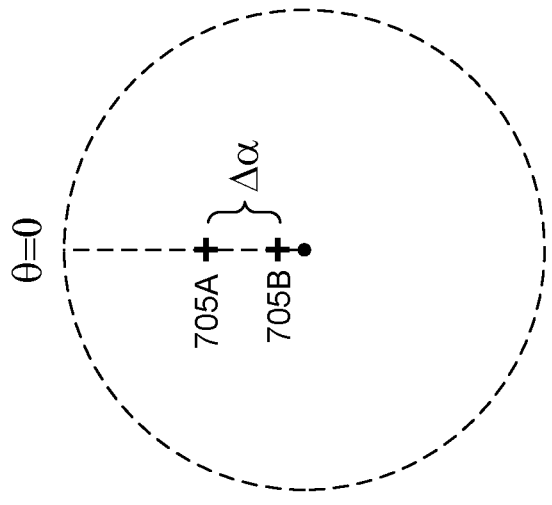

FIGS. 7A-7C are diagrams showing the effect of adjusting wavelength of the optical beams 105 and the rotational position of the dispersive optic 400. These diagrams are in polar coordinates, where each+marks the propagation direction of the Tx and Rx beams, respectively. The polar coordinate θ is the azimuth angle θ in FIG. 6. The radial coordinate α is the angle relative to the z-axis. An angle α=0 is a beam that is propagating on-axis along the z-axis. Large angles α correspond to beams that are propagating more off-axis.

FIG. 7A corresponds to the situation shown in FIG. 6. The dispersive optic 400 is rotated to θ=0 degrees. Both the Rx and Tx beams have azimuth angle θ=0 degrees, but the Tx beam 705A is bent more than the Rx beam 705B, so the Tx beam propagates with larger angle α compared to the Rx beam. The angular separation between the two beams is represented by Δα. In FIG. 7B, the dispersive optic 400 is rotated to azimuth position θ=45 degrees. The wavelengths of the Rx beam 705B and Tx beam 705A are not changed, so the angular separation Δα is the same. In FIG. 7C, the wavelength of the Tx beam 705A is changed to increase the angular separation Δα. For example, if the Rx beam 705B has the longer wavelength ("red" channel) and the Tx beam 705A has the shorter wavelength ("blue" channel) in FIG. 7B, then the wavelength of the Tx beam 705A in FIG. 7C may be even shorter.

In FIG. 7, the Rx beam 705B is more on-axis than the Tx beam 705A. For example if the angular separation Δα is used to implement point ahead of the Tx beam, then the Rx beam may be centered on-axis to couple into the Tx/Rx fiber, while the Tx beam is steered to a different direction to accommodate the point ahead.

The desired angular separation may be achieved by controlling the wavelengths of the Tx and Rx beams and by controlling the rotational position of the dispersive optic. Referring to FIG. 1, the controller 250 in a terminal may control the wavelength of the Tx beam 105A. For example, if the Tx source 225 or beacon source 227 is wavelength-adjustable, the controller 250 may set the Tx wavelength accordingly. The wavelength of the Rx beam 105B is set by the remote terminal, although the two FSO communication terminals may mutually determine the wavelengths of the Rx and Tx optical beams. Once the wavelengths are set, other components in the terminal, such as wavelength filters, may also be adjusted. For example, if the Rx detector 230 is wavelength-adjustable, controller 250 may adjust the Rx detector according to the selected Rx wavelength.

The selection of wavelengths depends on the wavelength dependence of the dispersive optic. In some cases, the wavelength dependence may be calibrated, and the controller 250 uses a calibration lookup table or other calibration reference to determine the wavelength of the optical beam (s). Calibration can be used to account for nonlinearity in the wavelength dependence and manufacturing variations.

The amount of dispersion and tunability is determined by system link requirements and engineering tradeoffs. Some applications may use a C-band tunable laser source, or a C-band and L-band tunable source. The tunability range affects the available choices of glass material and wedge angle. Some systems may achieve milliradians of angular separation with a silicon wedge of less than 10 degrees wedge angle over the C-band range. Wavelength tunability may be implemented in 50 GHz steps using traditional telecom components. There is the potential for more than 100 wavelength steps. If the maximum angular separation was 100 μrad (micro-radians), the wedge could be designed to provide 1 μrad steps in angular separation for each wavelength step. The design may be modified if, for example, only 5 μrad step resolution was required.

In some situations, the remote terminal may be in motion relative to the local terminal. To account for travel time of the Tx beam (e.g., when the relative velocity or distance between the local and the remote terminal is large), the local terminal may direct a Tx beam towards an expected future location of the remote terminal (instead of the current location of the remote terminal). This is generally referred to as point ahead, and the angular bias between the Rx and Tx beams is referred to as the point ahead angle. Depending on the situation, point ahead angles are approximately 100 μrad or less. The angular separation of the Tx and Rx beams may be set based on the point ahead angle.

Although the above descriptions are described in the context of FSO communications, the above description may be applicable for applications outside of FSO communications, and thus should not be limited to FSO communications. For example, the descriptions may be applicable for remote sensing applications.

Additional Considerations

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Depending on the form of the components, the "coupling" between components may take different forms. For example, dedicated circuitry can be coupled to each other by hard-wiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The invention claimed is:

1. A local free space optical (FSO) communication terminal configured to transmit and receive optical beams, the local FSO communication terminal comprising:
   a fore optic, wherein a receive (Rx) optical beam is received by the local FSO communication terminal through the fore optic and a transmit (Tx) optical beam is transmitted by the local FSO communication terminal through the fore optic, wherein the Tx optical beam has a different wavelength from the Rx optical beam;
   a dispersive optical component that is positioned along an optical path of the Tx optical beam and an optical path of the Rx optical beam; and
   a controller that controls a dispersion configuration of the local FSO communication terminal, wherein the controller controls the dispersion configuration based on one or more of adjusting a position of the dispersive optical component or adjusting a wavelength of one or more of the Tx optical beam or the Rx optical beam.

2. The local FSO communication terminal of claim 1, wherein the controller is configured to adjust the position by causing a rotation of the dispersive optical component.

3. The local FSO communication terminal of claim 1, wherein the dispersion configuration causes an angular separation between the Tx optical beam and the Rx optical beam.

4. The local FSO communication terminal of claim 3, wherein the angular separation is based on a point-ahead angle resulting from a relative motion between the local FSO communication terminal and a remote FSO communication terminal.

5. The local FSO communication terminal of claim 1, wherein the dispersive optical component comprises a refractive optical component, and wherein a wavelength dependence of the dispersive optical component is caused by a variation of an index of refraction as a function of wavelength.

6. The local FSO communication terminal of claim 1, wherein the dispersive optical component has a wavelength dependence and the controller is configured to use a calibrated reference to determine the wavelength of the Tx optical beam.

7. The local FSO communication terminal of claim 1, wherein the dispersive optical component comprises a diffractive optical component.

8. A method of operating a local free space optical (FSO) communication terminal configured to transmit and receive optical beams, the method comprising:
   adjusting, by a controller, a dispersion configuration of the local FSO communication terminal that causes dispersion of one or more of a transmit (Tx) optical beam or a receive (Rx) optical beam, wherein adjusting the dispersion configuration comprises adjusting a position of a dispersive optical component or a wavelength of one or more of the Tx optical beam or the Rx optical beam; and
   causing one or more of the Tx optical beam or the Rx optical beam to pass through the dispersive optical component according to the dispersion configuration for communication with a remote FSO communication terminal.

9. The method of claim 8, wherein adjusting the position of the dispersive optical component comprises causing rotation of the dispersive optical component.

10. The method of claim 8, wherein the dispersion configuration causes an angular separation between the Tx optical beam and the Rx optical beam.

11. The method of claim 10, wherein the angular separation is based on a point-ahead angle resulting from a relative motion between the local FSO communication terminal and the remote FSO communication terminal.

12. The method of claim 8, wherein the dispersive optical component comprises a refractive optical component, and wherein a wavelength dependence of the dispersive optical component is caused by a variation of an index of refraction as a function of wavelength.

13. The method of claim 8, wherein the dispersive optical component has a wavelength dependence, and further comprising using a calibrated reference to determine the wavelength of the Tx optical beam.

14. The method of claim 8, wherein the dispersive optical component comprises a diffractive optical component.

15. A non-transitory computer-readable medium storing computer-executable instructions that, when executed, cause:
adjusting, by a controller, a dispersion configuration of a local free space optical (FSO) communication terminal that causes dispersion of one or more of a transmit (Tx) optical beam or a receive (Rx) optical beam, wherein adjusting the dispersion configuration comprises adjusting a position of a dispersive optical component or a wavelength of one or more of the Tx optical beam or the Rx optical beam; and
causing one or more of the Tx optical beam or the Rx optical beam to pass through the dispersive optical component according to the dispersion configuration for communication with a remote FSO communication terminal.

16. The non-transitory computer-readable medium of claim 15, wherein adjusting the position of the dispersive optical component comprises causing rotation of the dispersive optical component.

17. The non-transitory computer-readable medium of claim 15, wherein the dispersion configuration causes an angular separation between the Tx optical beam and the Rx optical beam.

18. The non-transitory computer-readable medium of claim 17, wherein the angular separation is based on a point-ahead angle resulting from a relative motion between the local FSO terminal and the remote FSO communication terminal.

19. The non-transitory computer-readable medium of claim 15, wherein the dispersive optical component comprises a refractive optical component, and wherein a wavelength dependence of the dispersive optical component is caused by a variation of an index of refraction as a function of wavelength.

20. The non-transitory computer-readable medium of claim 15, wherein the dispersive optical component has a wavelength dependence, and wherein the instructions, when executed, further cause using a calibrated reference to determine the wavelength of the Tx optical beam.

* * * * *